United States Patent
Solve et al.

(10) Patent No.: US 6,353,645 B1
(45) Date of Patent: Mar. 5, 2002

(54) SYSTEMS AND METHODS FOR FAST TERMINAL SYNCHRONIZATION IN A WIRELESS COMMUNICATION SYSTEM

(75) Inventors: Torbjorn Solve, Cary; Mark Ranta, Apex, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/718,167

(22) Filed: Nov. 22, 2000

Related U.S. Application Data

(63) Continuation of application No. 09/173,328, filed on Oct. 15, 1998, now Pat. No. 6,205,193.

(51) Int. Cl.[7] .................................................. H04L 7/00
(52) U.S. Cl. ........................ 375/354; 455/522; 455/502; 370/510
(58) Field of Search ................................. 375/354, 365, 375/366, 368; 370/503, 509, 510, 513, 520; 455/522, 502, 574, 609

(56) References Cited

U.S. PATENT DOCUMENTS

| | | |
|---|---|---|
| 5,343,497 A | 8/1994 | Canosi et al. |
| 5,805,646 A | 9/1998 | Wang |
| 6,108,524 A * | 8/2000 | Hershey et al. ............ 455/67.1 |

FOREIGN PATENT DOCUMENTS

| | | |
|---|---|---|
| EP | 0 589 280 A | 3/1994 |
| EP | 0 756 432 A | 1/1997 |

OTHER PUBLICATIONS

Copy of International Search Report for PCT/US99/20212.

* cited by examiner

Primary Examiner—Jean Corrielus
(74) Attorney, Agent, or Firm—Myers Bigel Sibley & Sajovec

(57) ABSTRACT

Methods and systems are provided for synchronization of a mobile terminal to a communication system which provide faster access to the communication system and reduced risk of non-productive battery power consumption. In particular, the methods and systems of the present invention test one candidate carrier from a list of candidate carriers and perform a power profile to obtain an indication of signal strength of the carrier. This signal measurement is then compared to a threshold criteria. If the criteria is satisfied, the mobile terminal attempts synchronization with that carrier and, if successful, establishes a connection with the communication system. If the criteria is not satisfied, another candidate carrier is selected and tested similarly. Furthermore, the methods and systems of the present invention provide for tiered searching for a valid carrier with each level providing an increased likelihood of finding a carrier while, potentially, requiring a greater amount of time to obtain synchronization. The methods and systems of the present invention also provide a hierarchical approach to searching when no carrier has been identified which reduces the rate of battery power consumption while the mobile terminal is attempting to synchronize with a communication system.

10 Claims, 11 Drawing Sheets

| FIG. 3A | FIG. 3B | FIG. 3C |

FIG. 3A

SYSTEMS AND METHODS FOR FAST TERMINAL SYNCHRONIZATION IN A WIRELESS COMMUNICATION SYSTEM

RELATED APPLICATIONS

This application is a continuation of Application Ser. No. 09/173,328, filed Oct. 15, 1998 now U.S. Pat. No. 6,205,193.

FIELD OF THE INVENTION

This invention relates to communication systems and more particularly to synchronization of mobile terminals operating in a wireless communication system.

BACKGROUND OF THE INVENTION

Public cellular networks (public land mobile networks) are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as that designated as IS-54B (and its successor IS-136) in North America and the pan-European GSM system have been introduced. These systems, and others, are described, for example, in the book titled *Cellular Radio Systems* by Balston, et al., published by Artech House, Norwood, Mass., 1993. In addition, satellite based radio communication systems are also being utilized to provide wireless communications in various regions such as the Asian Cellular Satellite System (ACeS) generated by Lockheed Martin Corporation.

FIG. 1 illustrates a conventional terrestrial wireless communication system 20 that may implement one of the aforementioned wireless communication standards. The wireless system may include one or more wireless mobile terminals 22 that communicate within a plurality of cells 24 served by base stations 26 and a mobile telephone switching office (MTSO) 28. Although only three cells 24 are shown in FIG. 1, a typical cellular radiotelephone network may comprise hundreds of cells, and may include more than one MTSO 28 and may serve thousands of wireless mobile terminals 22.

The cells 24 generally serve as nodes in the communication system 20, from which links are established between wireless mobile terminals 22 and a MTSO 28, by way of the base stations 26 servicing the cells 24. Each cell 24 will have allocated to it one or more control channels and one or more traffic channels. The control channel is a dedicated channel used for transmitting cell identification and paging information. The traffic channels carry the voice and data information. Through the communication system 20, a duplex radio communication link 30 may be effected between two wireless mobile terminals 22 or between a wireless mobile terminal 22 and a landline telephone user 32 via a public switched telephone network (PSTN) 34. The function of the base station 26 is commonly to handle the radio communications within the cell 24 to and from the wireless mobile terminal 22. In this capacity, the base station 26 functions chiefly as a relay station for data and voice signals.

FIG. 2 illustrates a conventional celestial (satellite) wireless communication system 40. The celestial wireless communication system 40 may be employed to perform similar functions to those performed by the conventional terrestrial wireless communication system 20 of FIG. 1. In particular, the celestial wireless communication system 40 typically includes one or more satellites 42 that serve as relays or transponders between one or more earth stations 44 and satellite wireless mobile terminals 23. The satellite 42 communicates with the satellite wireless mobile terminals 23 and earth stations 44 via duplex communication links 46. Each earth station 44 may in turn be connected to a PSTN 34, allowing communications between the wireless mobile terminals 23 and conventional landline telephones 32 (FIG. 1).

The celestial wireless communication system 40 may utilize a single antenna beam covering the entire area served by the system, or as shown in FIG. 2, the celestial wireless communication system 40 may be designed such that it produces multiple, partially-overlapping beams 48, each serving a distinct geographical coverage area 50 within the system's service region. A satellite 42 and coverage area 50 serve a function similar to that of a base station 26 and cell 24, respectively, of the terrestrial wireless communication system 20.

Thus, the celestial wireless communication system 40 may be employed to perform similar functions to those performed by conventional terrestrial wireless communication systems. In particular, a celestial radiotelephone communication system 40 has particular application in areas where the population is sparsely distributed over a large geographic area or where rugged topography tends to make conventional landline telephone or terrestrial wireless infrastructure technically or economically impractical.

In both terrestrial and satellite based communication systems, it is known that a mobile terminal typically must first synchronize with a particular base station on the communication system by locating the appropriate carrier for a control channel of a base station which is capable of transmitting to and, preferably, receiving from the mobile terminal. The communication system typically transmits a synchronization burst during some repeating time portion or segment of a multi-frame of a Time Division Multiple Access (TDMA) system or at recurring intervals in an analog system. Because cellular systems typically use a variety of carriers for control channels in various cells or regions of the geographic area covered by the communication system, the mobile terminal generally searches a plurality of candidate carriers before selecting a carrier for synchronization. For example, the ACeS system includes 170 potential TDMA carriers separated 200 kHz from each other transmitting one m-sequence burst every 470 ms for use in synchronization.

It is also known to facilitate the synchronization process by providing a mobile terminal with a list of candidate carriers to consider when attempting to synchronize with a transmitter of a communication system. The mobile terminal typically tests each of the candidate carriers and selects a best candidate. The selection may be based on comparing the power of the signal received from each of the candidate carriers. A coarse synchronization followed by a fine synchronization are then typically performed with the selected carrier. For a TDMA system, this synchronization typically involves both frequency and time synchronization. After fine synchronization, the mobile terminal generally attempts to read data, such as a broadcast control channel transmission, to access the communication system.

While this approach to synchronization is effective, it can be problematic with low link margin communication systems. For example, satellite communication systems typically require a greater time for each candidate carrier to attempt to establish synchronization. This can result in an undesirable delay between a user seeking communication access, for example, by powering up the mobile terminal, and successful synchronization with the communication system. In addition, a further problem with low link margin communication systems such as satellite systems is that the mobile terminal may be in a blocked position, such as in a building, where it will not be possible for the mobile terminal to successfully receive a signal from the communication system. The synchronization system of the mobile terminal may then consume excessive battery power with repeated unsuccessful attempts to connect to the communication system. Accordingly, there is a need for improved synchronization systems and methods for mobile terminals operating in low link margin environments.

SUMMARY OF THE INVENTION

It is, therefore, an objective of the present invention to resolve the problem of slow synchronization of a mobile terminal with a low link margin communication system.

It is a further objective of the present invention to resolve the problem of battery power consumption due to unsuccessful attempts to synchronize a mobile terminal with low link margin communication systems.

These and other objects are provided, according to the invention, by providing methods and systems for synchronization of a mobile terminal to a communication system which provide faster access to the communication system and reduced risk of non-productive battery power consumption. In particular, the methods and systems of the present invention test one candidate carrier from a list of candidate carriers and perform a power profile to obtain an indication of signal strength of the carrier. This signal measurement is then compared to a threshold criteria. If the criteria is satisfied, the mobile terminal attempts synchronization with that carrier and, if successful, establishes a connection with the communication system. If the criteria is not satisfied, another candidate carrier is selected and tested similarly. Furthermore, the methods and systems of the present invention provide for tiered searching for a valid carrier with each level providing an increased likelihood of finding a carrier while, potentially, requiring a greater amount of time to obtain synchronization. The methods and systems of the present invention also provide a hierarchical approach to searching when no carrier has been identified which reduces the rate of battery power consumption while the mobile terminal is attempting to synchronize with a communication system.

In particular, a method for synchronization with a transmitter of a mobile terminal having a list of candidate carriers is provided. A first carrier is selected from the list of candidate carriers and a power profile of the first carrier is generated. The power profile of the first carrier is compared to a first threshold criteria. If the power profile of the first carrier satisfies the first threshold criteria, the mobile terminal synchronizes to the first carrier.

According to another embodiment of the methods of the present invention the method further includes selecting a second carrier from the list of candidate carriers if the power profile of the first carrier does not satisfy the first threshold criteria. A power profile of the second carrier is generated and compared to a second threshold criteria The mobile terminal is synchronized to the second carrier if the power profile of the second carrier satisfies the second threshold criteria. The second threshold criteria is preferably more lenient than the first threshold criteria. The power profile of the first carrier may be generated based on readings of a first number of multiframnes and the power profile of the second carrier may be generated based on readings of a second number of multiframes greater than the first number. Preferably the first number is greater than one and the second number is greater than five.

In a further embodiment of the present invention the first carrier is selected from a first candidate subset of the list of candidate carriers and the second carrier is selected from a second candidate subset of the list of candidate carriers. The first candidate subset includes a plurality of candidate carriers and the selecting, generating, comparing and synchronizing operations for the first carrier are repeated for successive ones of the candidate carriers of the first candidate subset until at least one of a first candidate satisfies the first threshold criteria and all of the candidate carriers of the first candidate subset fail to satisfy the first threshold criteria occurs. The second carrier is selected from the second candidate subset if the power profile of all of the candidate carriers of the first candidate subset do not satisfy the first threshold criteria. The second candidate subset preferably also includes a plurality of candidate carriers and the selecting, generating, comparing and synchronizing operations for the second carrier are repeated for successive ones of the candidate carriers of the second candidate subset until at least one of the candidate carriers of the second candidate subset satisfies the second threshold criteria and all of the candidate carriers of the second candidate subset fail to satisfy the second threshold criteria occurs.

The second candidate subset may include a subset of candidates of the first candidate subset which are most likely to have a power profile which satisfies the second threshold criteria. The selecting, generating, comparing and synchronizing operations for the second carrier may be followed by the step of repeating the selecting, generating, comparing and synchronizing operations for the second carrier for successive ones of the candidate carriers of the first candidate subset which are not in the second candidate subset until at least one of a candidate carrier of the first candidate subset which is not in the second candidate subset satisfies the second threshold criteria and all of the candidate carriers of the first candidate subset which are not in the second candidate subset failing to satisfy the second threshold criteria occurs. The selecting, generating, comparing and synchronizing operations for the first carrier may be repeated first for successive ones of the first candidate subset which are in the second candidate subset.

In a further embodiment, the methods of the present invention also include the steps of coarse synchronizing to the first carrier and then fine synchronizing to the first carrier. Data is then read from the first carrier and checked to determine if it is valid data In this embodiment, a second carrier is selected from the list of candidate carriers if the data is not valid. The data may be from a broadcast control channel burst. In another aspect of this a measure of coarse synchronization to the first carrier is compared to a third threshold criteria and the mobile terminal fine synchronizes to the first carrier if the measure of coarse synchronization satisfies the third threshold criteria.

In yet another aspect of the present invention, the mobile terminal enters a watch mode if the power profile of the first carrier does not satisfy the first threshold criteria. Selecting, generating, comparing and synchronizing operations are repeated at predetermined intervals during the watch mode. The watch mode is exited if the power profile of the first carrier satisfies the first threshold criteria. These operations may be performed during watch mode for each of a selected plurality of candidates of the first candidate subset which are most likely to have a power profile which satisfies the first threshold criteria.

While the present invention has been primarily described herein with reference to method aspects of the invention, it is to be understood that it also encompasses system aspects. For example, in a system aspect of the present invention a synchronization system for a mobile terminal having a list of candidate carriers is provided. The system includes a means for selecting a first carrier from the list of candidate carriers and a means for generating a power profile of the first carrier. A means for comparing the power profile of the first carrier to a first threshold criteria is also provided as well as a means for synchronizing to the first carrier if the power profile of the first carrier satisfies the first threshold criteria.

Accordingly, the present invention provides apparatus and methods allowing operation of a terminal in a low link margin system with more rapid synchronization and reduced battery power consumption. The present invention provides these benefits through threshold detection/selection criteria, hierarchical search structures and a watch mode continuous search capability to provide extended battery life.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods or devices. Accordingly, the present invention may take the form of a hardware embodiment, a software embodiment or an embodiment combining software and hardware aspects.

Figure 1:
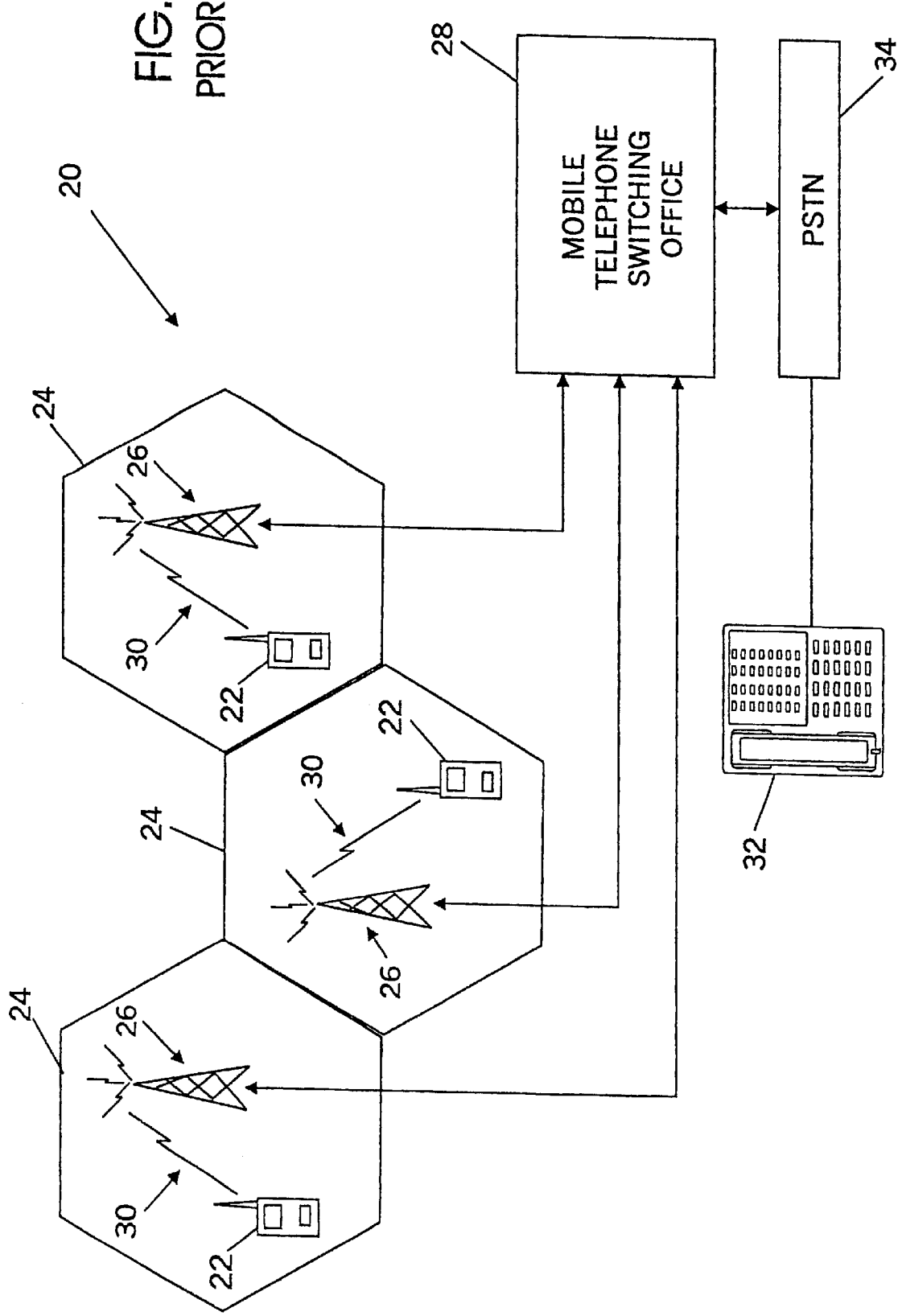
FIG. 1 schematically illustrates a portion of a wide area cellular network including a plurality of base stations servicing different geographic areas.
Figure 2:
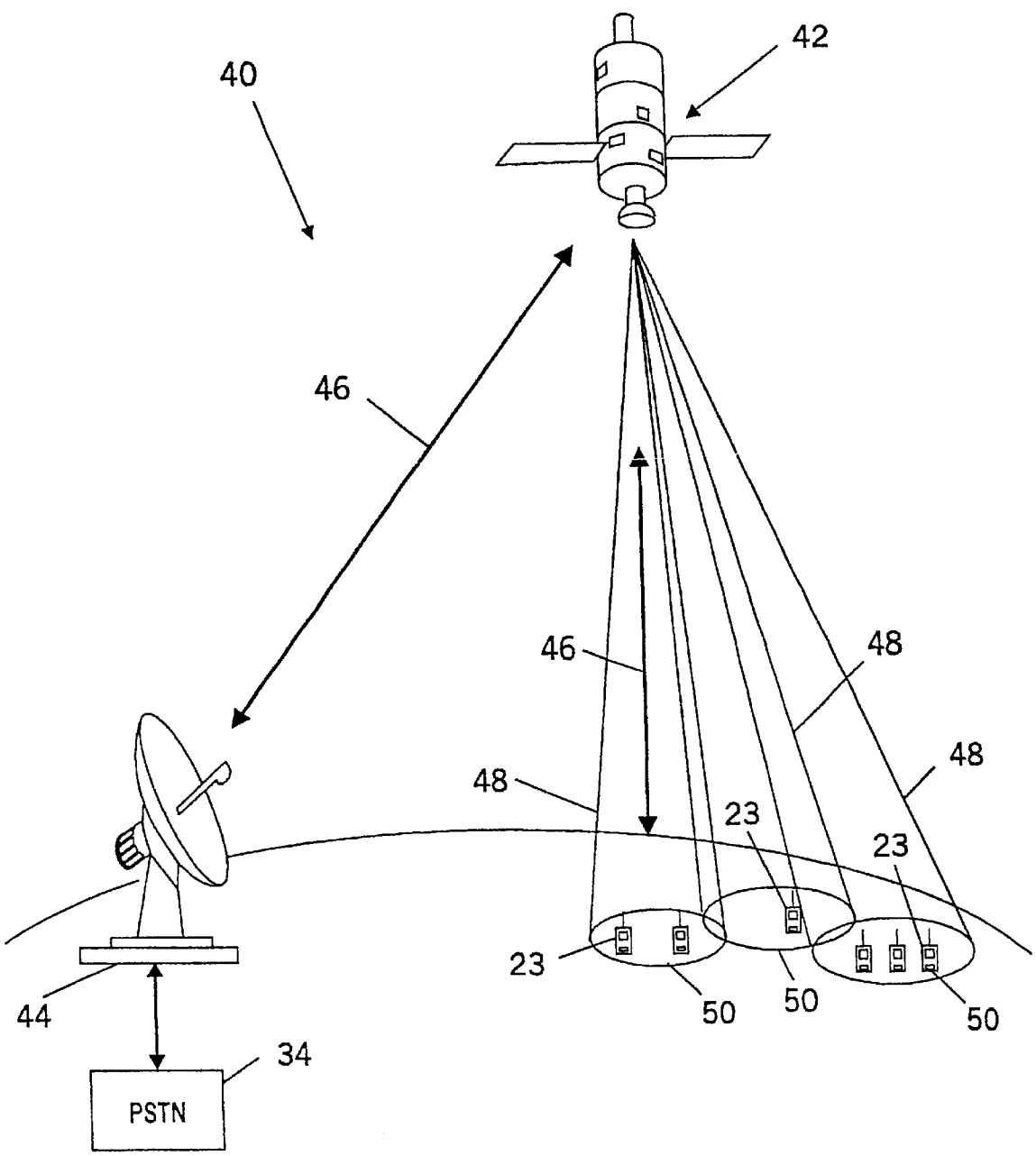
FIG. 2 schematically illustrates a portion of a satellite based wide area cellular network having spot beams covering different geographic areas.
Figure 3B:
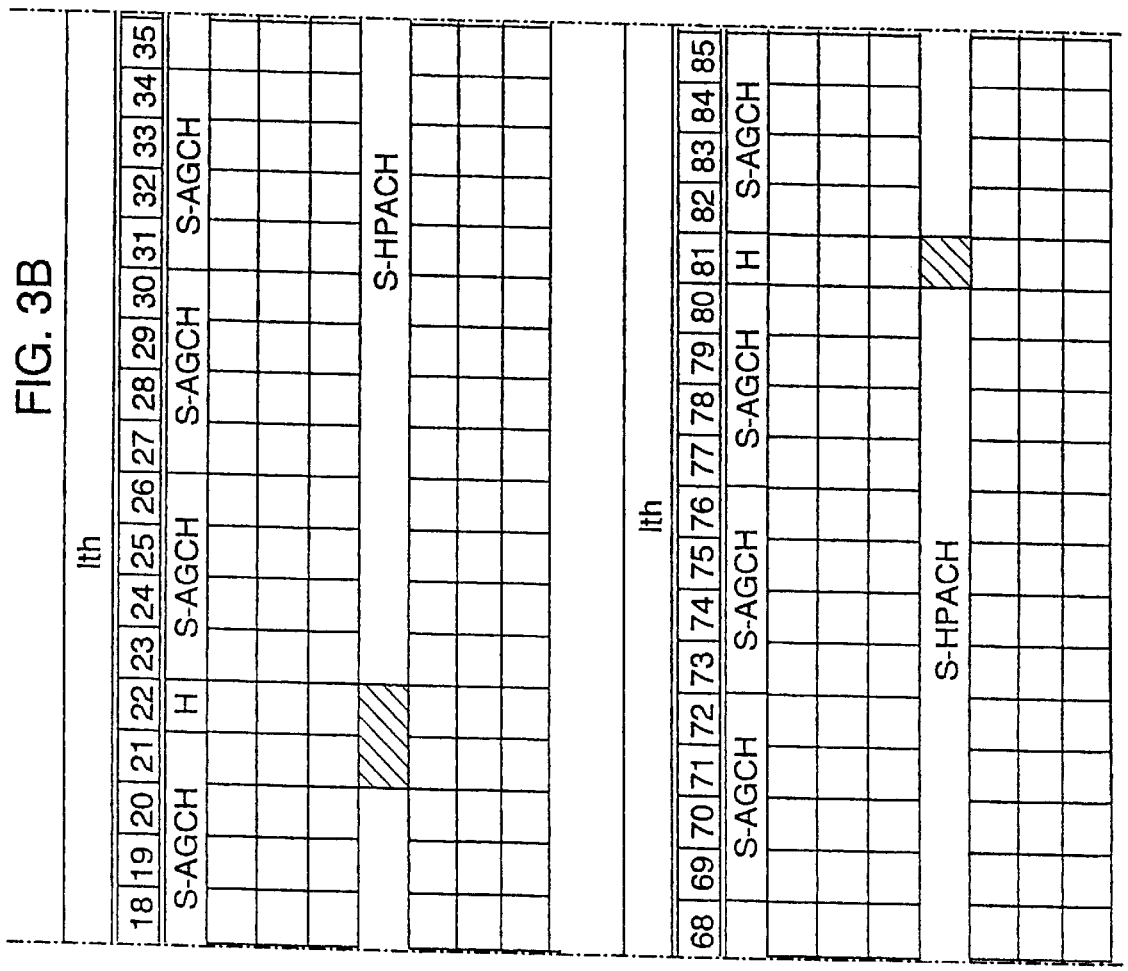
FIG. 3 illustrates the multiframe configuration for a forward channel in the Asian Cellular Satellite System.

For purposes of facilitating understanding of the present invention, this detailed description will provide a description of operations for various embodiments in the operating environment of the ACeS communication system operating using the ACeS Satellite Air Interface Specification ("SAIS"). Initial synchronization and spot beam selection in this system is an important part of the functionality of a mobile terminal. For a known control channel carrier synchronization and selection procedures under the ACeS system are performed using the following four steps:

1. As illustrated in FIG. 3, the control channel for ACeS includes a plurality of high power bursts transmitted at a 7.6 dB higher power than the rest of the bursts. These high power bursts are indicated with the character "H" as seen in time slot 0 for frames 0, 22, 61 and 81 within the 102 frame dual control multiframe (DCMF) of FIG. 3. Knowledge of the time separation between these high power bursts may be used by the mobile terminal via power profiling. Power profiling as used herein generally refers to known techniques for characterizing the power of a received signal. In one type of power profiling, the receiver of the mobile terminal typically samples the amplitude of the received signal integrated over a duration of ¼ of a TDMA slot, corresponding in time to ¹/₃₂ of a TDMA frame or ¹/₃₂₆₄ of a DCMF. Samples are accumulated in 3264 different time bins dependent on the relative timing within the DCMF. The larger number of DCMFs over which the samples will be accumulated, the higher probability for detection can be achieved. However, a time penalty is incurred by increasing the number of multiframes over which power readings are accumulated. A method for power profiling appropriate for use with the present invention is described in U.S. patent application Ser. Nos. 08/728,179 and 08/768,975 which are incorporated herein by reference in their entirety. Also included herein by reference is U.S. Pat. No. 5,805,646 also related to power profiling. As a result of this initial step in synchronization a timing accuracy is expected of +/−½ slot or approximately +/−288 microseconds. This power measurement step in the process only addresses timing synchronization at the known carrier frequency and any frequency error of the mobile terminal with reference to the broadcasting satellite is not detected or corrected during this step.

2. Using the knowledge of timing available from step 1, the mobile terminal samples both phase and received signal strength indication (RSSI) of the carrier at a bit rate such as 270.83 KS/s. The ACeS SAIS specifies TDMA frame 0, timeslot 0 to carry a burst with a 144-bit m-sequence. Samples generally will be taken for the duration of the m-sequence plus the number of samples required to sort out remaining timing inaccuracy, i.e., +/−78 bits. The mobile terminal takes the I and Q values of the samples and conducts a large number of correlations versus the expected m-sequence. Correlations are typically computed for each potential timing within the uncertainty window. Much of the received frequency error is also resolved by calculating these correlations using assumed frequency offsets. A number of different frequency bins, for example 21, may be considered in which case a separation of the frequency bins of 1 KHz may be provided in the ACeS system allowing the mobile terminal to cope with frequency inaccuracies of up to +/−10 KHz. After calculation of all the correlations, the one with the largest (best) value will be selected to determine the frequency and timing offset. This step may generally be referred to as "coarse synchronization."

3. Following the coarse synchronization of step 2, a fine synchronization is generally performed which is generally simply a repetition of the coarse synchronization with the exception that the uncertainty window in both the time and frequency domains is adjusted. Between step 2 and step 3, a frequency adjustment of the terminal reference oscillator is performed corresponding to the estimated error from the step 2 coarse synchronization. For example, for the embodiment described above, a timing window of 5 samples and a frequency span of 1 KHz is covered, thereby significantly reducing the number of calculations. The separation of the frequency bins is thus reduced to 50 Hz. The selected largest correlation value now represents the timing accuracy of approximately +/−1 bit and a frequency accuracy of approximately 150 Hz (as, in practice, there is typically enough uncertainty in the mobile terminal hardware so as to preclude a 50 Hz accuracy). Accordingly, the fine synchronization step of step 3 improves upon the timing and frequency accuracy arrived at in the coarse synchronization of step 2.

4. The synchronization steps described above are still insufficient to insure that the mobile terminal has achieved proper synchronization as no actual data has yet been read from the carrier. Accordingly, the final step in acquiring a beam is to decode data sent by the satellite, typically via the broadcast control channel. In the ACeS system, both a standard power broadcast control channel (S-BCCH) and a high power broadcast control channel (H-BCCH) are provided. Accordingly, the mobile terminal may first attempt to acquire the regular power S-BCCH channel and then attempt to acquire the high power H-BCCH channel with its greater link margin if the first attempt fails. The H-BCCH channel provides extra link margin using both higher transmit power from the satellite and additional coding protection. As illustrated in FIG. 3 in the ACeS system, the H-BCCH resides in TDMA frame numbers 22, 61 and 81.

One problem with the above-described synchronization and spot beam acquisition procedure in the ACeS system, and generally for low link margin communication systems is the lapse time for the full terminal synchronization sequence described which may exceed 30 seconds in disadvantaged situations. This is expected even with the assumption that the control channel carrier is known. However, as described in the background section, in the ACeS system, as with typical communication systems, several alternative control channel carriers are provided by the communication system. The use of multiple control channel carriers provides for benefits in a cellular re-use pattern as it is not desirable to re-use the exact same control frequency in two adjacent cells (satellite beams) as this would typically result in interference degradation of the signals. Furthermore, for a system such as ACeS with an earth foot print spanning many different countries, it is unlikely that the same frequencies will be available in the fill coverage area. For example, the ACeS satellite system provides radio coverage over its service area using 140 different spot beams each of which has at least one dedicated carrier for transmission of control channel information selected from the available 170 potential TDMA carriers. Therefore, in a worst case scenario as many as 140 potential candidate carriers exist which, using known procedures potentially requiring 30 seconds or more per carrier, could result in a very long initial synchronization time.

As discussed in the background section, this problem has been partially dealt with by methods intended to initiate a search sequence on subsets of the universe of potential carriers which have a higher probability of success such as using carriers of previously acquired beams for a mobile terminal which has a history of use. A list of candidate carriers may be maintained in nonvolatile memory of the mobile terminal.

An additional problem is also present in satellite or other low link margin systems which are subject to blockage for any reason. In such systems, a mobile terminal may unsuccessfully attempt to search for the communication system for a significant period of time. As a large portion of the synchronization process typically requires the full receiver to be turned on, these operations are very power consuming. Accordingly, the terminal battery can be drained thereby leaving it unavailable to the user of the mobile terminal after the user moves to a less disadvantaged location where the mobile terminal would not otherwise be subject to blockage.

Operations of the present invention will be described primarily herein with reference to mobile terminals which will operate in a satellite system such as the Asia Cellular Satellite system. However, the benefits of the present invention may also be realized with mobile terminals which operate in other low link margin communication systems.

Figure 4:
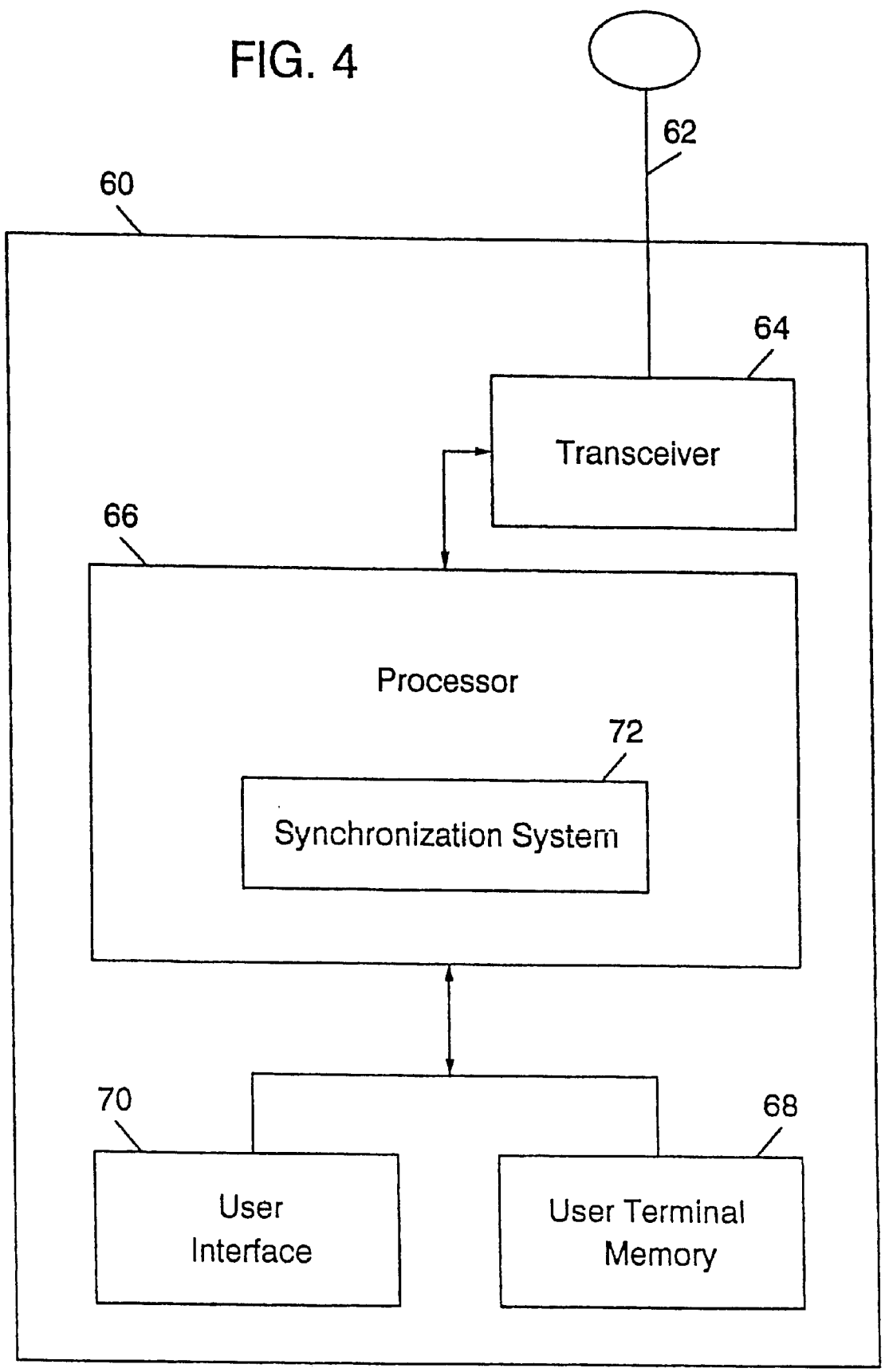
FIG. 4 is a block diagram of a mobile terminal according to an embodiment of the present invention.

Referring now to the embodiment illustrated in FIG. 4, the user (mobile) terminal 60 is a transceiver device capable of communicating with the satellite communications system 40. The user terminal 60 may operate as a satellite radiotelephone. The user terminal 60 includes an antenna 62 and transceiver 64 or other transceiver means for transmitting and receiving communications to/from the satellite network. The processor 66 accepts and provides information to and from the transceiver 64 and selects a control channel for the user terminal 60 to communicate with the satellite communication network 40. The user terminal memory 68 stores information related to the satellite communication network 40. The user interface 70 may include a key pad by which the user may control the operation of the user terminal 60. User terminal 60 also includes a synchronization circuit 72 or other synchronization means for synchronizing mobile terminal 60 to satellite communication network 40 according to the present invention.

User interface 70 provides both an input and output means. Interface 70, according to one embodiment of the present invention, includes display means for notifying a user, for example, that synchronization has been accomplished. Interface 70 further includes an input means, such as a keyboard, for receiving input from the user, for example, specifying available or preferred carriers and starting or stopping synchronization operations. Processor 66, in this embodiment, includes means for controlling the transceiver 64 so as to communicate over the satellite network 40. Memory 68 preferably contains one or more lists of candidate carriers.

As will be appreciated by those of skill in this art, the above-described aspects of the present invention in FIG. 4 may be provided by hardware, software, or a combination of the above. While various components of mobile terminal 60 have been illustrated in FIG. 4, in part, as discrete elements, they may, in practice, be implemented by a microcontroller including input and output ports and running software code, by custom or hybrid chips, by discrete components or by a combination of the above. For example, memory 68 may be contained within processor 66.

Operations of the present invention will now be described with respect to the flowcharts of FIGS. 5 through 9. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 5:
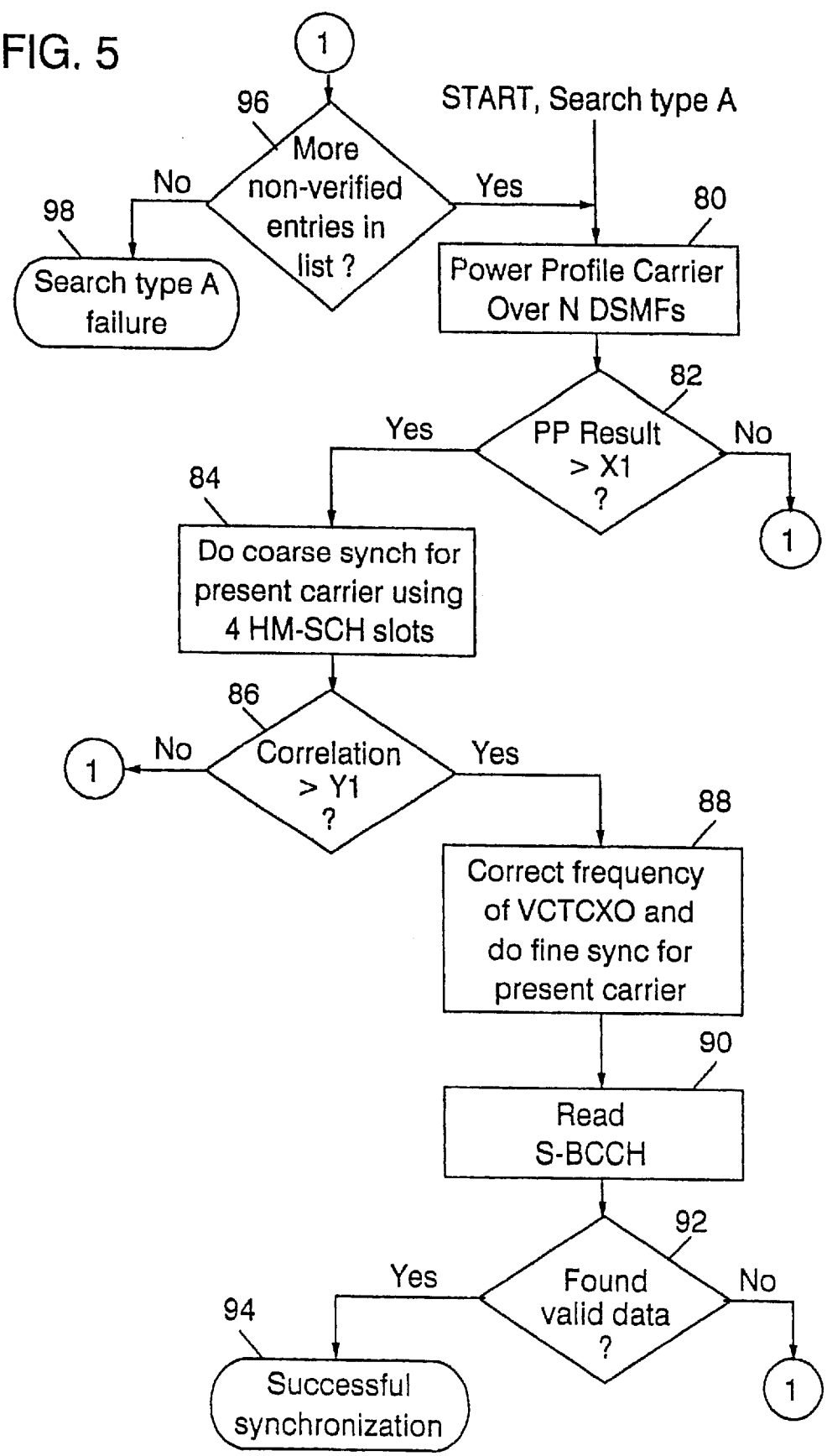
FIG. 5 is a flowchart illustrating operations for searching carriers to establish synchronization according to an embodiment of the present invention.

Referring now to FIG. 5, synchronization operations begin at block 80 by generating a power profile for a first selected candidate carrier. In the illustrated embodiment of FIG. 5, the power profile or power characteristic of the carrier is based upon accumulated difference values for the carrier $RSSI_{AccDiff}$. The duration of accumulation of the $RSSI_{AccDiff}$ value is determined as a function of the desired probability of detection of the carrier and time allowed for the search. As with the other parameters of the operations to be described, selectable values are chosen for each embodiment of the system based on its particular operating environment and to allow an indication of a successful search criteria to result in quicker determination of the presence of a relevant signal rather than providing the opposite effect. As will be described, this allows the present invention to provide methods and systems which sequentially cover all potential scenarios (or carriers) while only passing through a full search in a priority controlled order.

With respect to the accumulation period in block 80 for the illustrated preferred embodiment of the present invention, the inventors have found that accumulation over 3 DCMF periods provides the desired sensitivity relative to the length of search time. In the illustrated embodiment of the present invention, $RSSI_{AccDiff}$ is calculated as follows:

$RSSI_{AccDiff}$=Old $RSSI_{AccDiff}$+2{$X(t)$+$X(t-672)$+$X(t-1312)$+$X(t-2560)$}−$X(t-32)$−$X(t+32)$−$X(t-704)$−$X(t-640)$−$X(t-1344)$−$X(t-1280)$−$X(t-2592)$−$X(t-2528)$ Where, $X(t)=Y(t)+Y(t-1)+Y(t-2)+Y(t-3)$, Y(t) as expressed in these equations is the integrated RSSI over the duration of ¼ TDMA slot, hence X(t) corresponds to integration over one full TDMA slot.

At block 82, the $RSSI_{AccDiff}$ value (PP) is compared to a threshold criteria $RSSI_{Thers1}$ indicated as X1 in FIG. 5. Based on this power characteristic or power profile of the carrier from block 80, operations according to the present invention allow carriers which are less likely to be successfully obtained to be disqualified quickly, thereby reducing synchronization time for the mobile terminal. The threshold criteria in block 82 may be an absolute value for power or a relative value. For example, with the preferred power profiling approach discussed herein, power profile hypotheses are generated for a plurality of different timing alignments between the carrier and the mobile terminal. As a valid carrier (in ACeS) would be expected to generate a higher power burst only in selected slots, a valid carrier would be expected to have a significantly greater power for the correct timing compared to the accumulated power for incorrect timing hypotheses (which would be expected to accumulate noise magnitude amplitude information rather than high power information). Accordingly, where a relative value is used as the threshold criteria, the criteria itself expresses the minimum expected difference in value between the best estimate power profile and other accumulated profiles (for example, as expressed by a minimum value, second maximum value or average value). In the embodiment of the present invention illustrated in FIG. 5, the accumulated power information is expressed as a metric for each of the timing hypothesis with the largest metric value corresponding to the best hypothesis. Further, it is preferred that a relative qualifier is used where the relative qualifier is the difference between the maximum metric value and a second maximum, appearing outside a time exclusion window. This exclusion window includes the sampling point corresponding to the maximum metric value, the 4 preceding and the 4 succeeding sampling points. The metric values calculated for these points would include some of the energy of the high power bursts and would, hence, potentially not function as valid references.

If the power profile of the carrier satisfies the threshold criteria, operations move to block 84 and the mobile terminal continues to pursue the carrier by attempting a coarse synchronization such as that described above for the ACeS system. A result characteristic for the coarse synchronization operations of block 84, referred to as a correlation in the illustrated embodiment, is tested at block 86 to determine if it exceeds a coarse synchronization threshold criteria. In the embodiment illustrated in FIG. 5, coarse synchronization operations at block 84 are accumulated over four multiframes. The correlation value (C) used in block 86 is output from operations at block 84 and may be provided according to the following equation:

$$C(k)=\sum_{n=0}^{141}I(n+k)t_I(n)+\sum_{n=0}^{141}Q(n+k)t_Q(n) \quad k=0\ldots N$$

where

N is the synchronization window size $t_I(n)$ is the training sequence for the in-phase vector $t_Q(n)$ is the training sequence for the quadrature-phase vector I(n) is the received sample of the in-phase signal Q(n) is the received sample of the quadrature-phase signal A predetermined qualifying threshold $C_{Thers1}$ (noted as Y1 in FIG. 5) is used as a threshold criteria to determine whether synchronization operations should continue further for the present carrier. If C satisfies threshold criteria $C_{Thres1}$ it is assumed that the likelihood of a successful synchronization procedure on the present carrier is high and operations proceed to block 88. At block 88, fine synchronization operations such as described previously for ACeS are performed on the carrier and operations then proceed to block 90 where the mobile terminal, with its corrected frequency and timing, attempts to read the low power S-BCCH transmission. If valid data is read during operations at block 90, as determined at block 92, then the synchronization on the candidate carrier was successful as indicated at block 94.

If the threshold criteria are not satisfied at block 82 or block 86 or no valid data is found at block 92, operations return to block 96. At block 96, the mobile terminal refers to a stored list of candidate carriers and determines if any additional candidate carriers are available for synchronization attempts. If no additional candidates remain, then the search is indicated to have failed at block 98. Otherwise, operations continue for the new candidate as described for block 80 through 94.

The list of candidate carriers is preferably broken in to a number of sublists such as best candidate, neighbor candidates and active. For example, the best candidate list may be limited to the one to three most recent carriers to which the mobile terminal has successfully synchronized and registered on the system. The neighbor list may expand upon the best list to include carriers associated with spot beams which neighbor those previously used by the mobile terminal with serving and/or neighboring satellite systems. Finally, the active list may be system information identifying which of the 170 potential carrier frequencies (in the case of ACeS system) are currently in use by the communication system.

As described above, the methods and systems of the present invention provide for faster synchronization operations by introducing threshold criteria utilized at intermediate steps of the synchronization process for each candidate carrier before continuing operations. Accordingly, time consuming additional steps, such as fine synchronization and data reading from broadcast information, need only be attempted after previous steps provide a reason to believe that there is a high likelihood that the mobile terminal, after a full synchronization, will be in an advantaged enough position to be able to at least successfully receive data from the communication network. While candidate carrier lists may not result in the selection of the "best" available carrier, as with the previously known methods of first testing all candidate carriers, the present invention advantageously provides quicker potential synchronization while still providing a selection of carrier which is likely to give bi-directional communication to the mobile terminal. In addition, by ranking within the lists carriers in probability order to try a most probable carrier first and so on, the likelihood of obtaining the "best" carrier for the mobile terminal is increased according to the methods and systems of the present invention.

In a further aspect of the present invention, methods and systems are provided which include differential searching operations. Each level of search may be more rigorous providing an increased likelihood of successful acquisition at the cost of increased time consumption per attempted search. By varying synchronization attempts between the various types of searches based upon criteria as will be described herein, further performance benefits may be provided according to the present invention.

Figure 6:
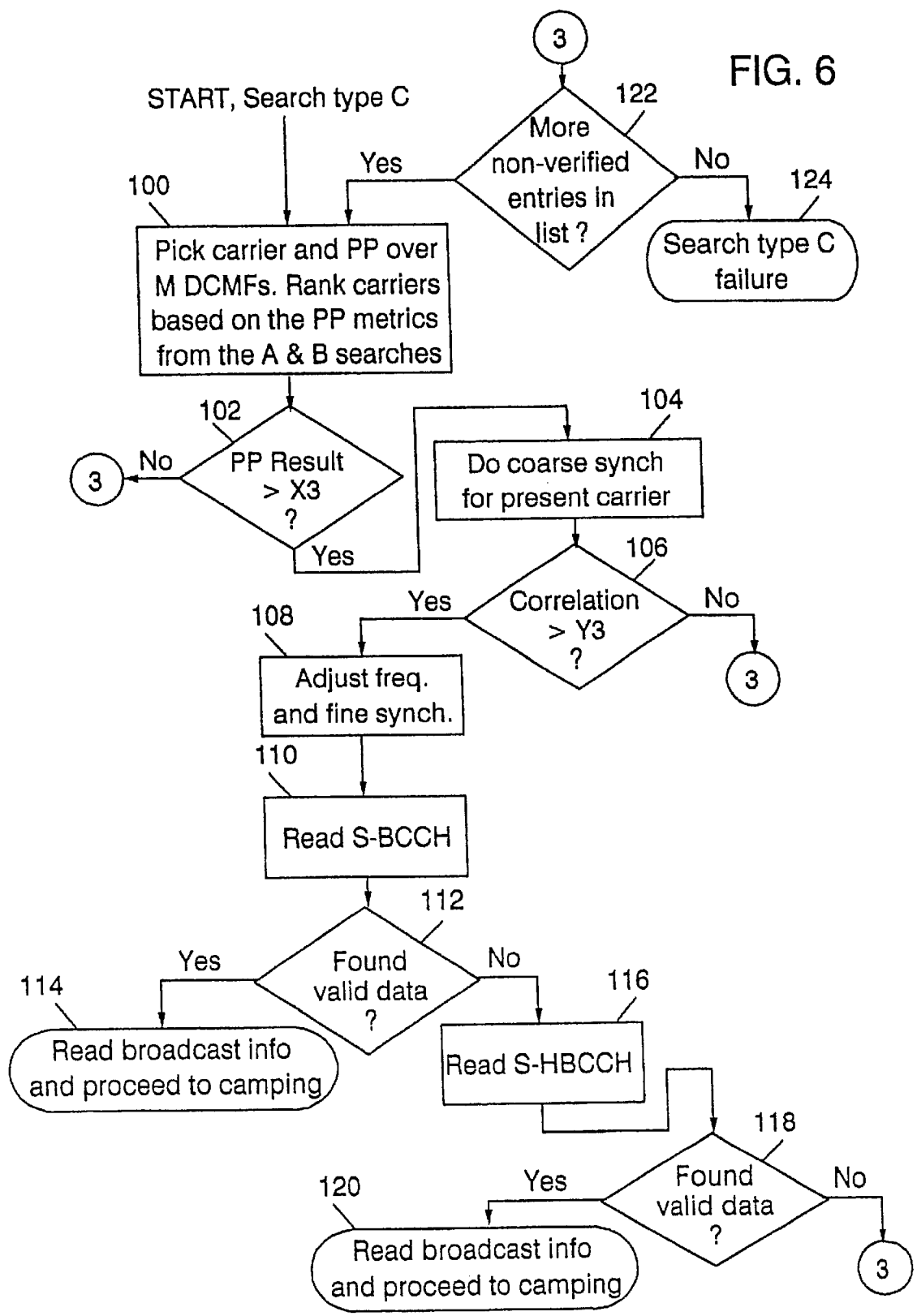
FIG. 6 is a flowchart illustrating operations for searching carriers to establish synchronization according to a further embodiment of the present invention.

Referring now to FIG. 6, synchronization operations for an alternative search sequence according to the present invention will now be described. The flow chart of FIG. 6, similarly to FIG. 5, begins with performing a power profile on a candidate carrier at block 100. For operations at block 100, as contrasted with block 80 of FIG. 5, the power profile operation is accumulated over a greater number of multiframes, such as 10 multiframes as contrasted with 3 in FIG. 5.

The selection of the carrier priority search order for operations according to the search type shown in FIG. 6 may be based on power profiling information previously acquired in search attempts by the mobile terminal utilizing the operations described in FIG. 5. For example, if all of the tested carriers in searches such as those described in FIG. 5, hereinafter referred to as type A searches, terminated at block 82 because the power profiles failed to meet the threshold criteria, the first tested carrier at block 100 may be selected as the carrier with the highest power profile from previous type A searches.

At block 102, the power profile for the carrier is compared to a threshold criteria X3. Operations at block 102 are similar to those previously described with respect to block 82, except that, in the illustrated embodiment, the threshold criteria (X3) for operations at block 102 is selected at a lower (i.e., easier to satisfy) criteria value compared to operations at block 82. In other words, a carrier rejected in a FIG. 5 type A search at block 82 may be accepted at block 102 with the same power profile based on the less demanding threshold criteria.

If the power profile result satisfies the criteria, coarse synchronization is attempted at block 104 in the manner described previously for block 84 for FIG. 5. Similarly, at block 106, a correlation result from the coarse synchronization is compared to a threshold criteria (Y3) as described previously in connection with block 86 of FIG. 5. However, as with operations at block 102, it is preferred that the threshold criteria for operations at block 106 be lower (easier to satisfy) than those used at block 86 and referred to as Y1.

If the correlation criteria is satisfied at block 106 operations continue at block 108 with fine synchronization for the candidate carrier as described in connection with block 88 of FIG. 5. An attempt to read the low power S-BCCH signal is then made at block 110 as previously described with respect to block 90 of FIG. 5. If valid data is acquired from operations at block 110 as determined at block 112, the synchronization attempt has been successful as indicated at block 114.

If valid data is not found at block 112, operations move to block 116 and an attempt is made to read valid data from the high power broadcast control channel. If valid data is read from the high power channel as determined at block 118 a successful synchronization is indicated at block 120.

If synchronization operations fail to meet threshold criteria at block 102 or block 106 or valid data is not detected at block 118, operations return to block 122 to determine if additional candidate carriers are available for selection for a FIG. 6 level search which will be generally referred to as a Type C search. If no additional candidate carriers remain for testing, the search is considered a failure as indicated at block 124. Otherwise, operations proceed for the next carrier on the candidate list as described for block 100 through 120.

Figure 7:
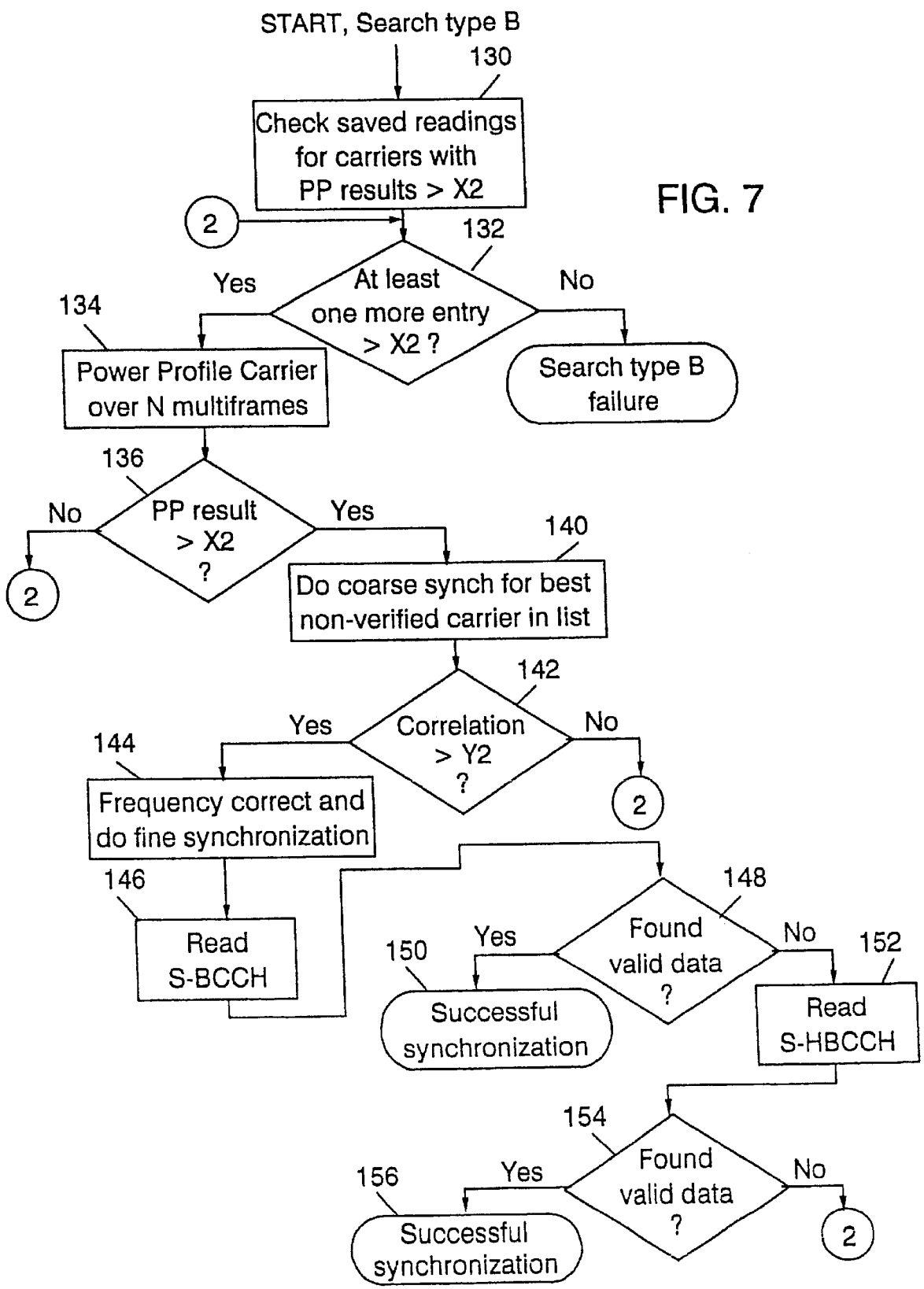
FIG. 7 is a flowchart illustrating operations for searching carriers to establish synchronization according to a further embodiment of the present invention.

Referring now to FIG. 7, a third or intermediate level search is illustrated. The search type illustrated in FIG. 7 will be referred to generally herein as a Type B search. At block 130, saved power profile results for carriers previously tested under a Type A search which failed are compared to a power point threshold value X2 different from the X1 and X3 thresholds. The threshold value X2 in a Type B search is preferably an intermediate value which is easier to satisfy than the X1 value from block 82 of FIG. 5 but harder to satisfy than the X3 value from block 102 of FIG. 6. In one embodiment of the present invention, the X1 value is chosen as a value which correlates with a likelihood of being able to successfully establish both uplink and downlink communications. X2 is selected as a value which correlates with a likelihood of being able to establish at least a downlink (i.e. receive data from the system even if unable to transmit to the system). X3 is chosen as a lower value which, while not as likely to accomplish even a downlink reception, is worth attempting as the X1 and X2 criteria have not been satisfied. If an entry still remains to be tested as determined at block 132, operations proceed to block 134 and a power profile for the candidate carrier is determined based on a selected number of DCMF multiframes, preferably 3.

If the calculated power profile from operations at block 134 is determined at block 136 to meet the threshold criteria X2, operations continue to block 140 for an attempt at coarse synchronization as previously described with reference to block 104 of FIG. 6 and block 84 of FIG. 5. Alternatively, operations at block 134 and 136 may be bypassed and a coarse synchronization may be attempted on any carrier having a power profile satisfying the X2 threshold criteria without recalculating the power profile of the carrier. In the illustrated embodiment, the power profile is re-calculated as these values may change significantly during the time delay between execution of a Type A search and a Type B search on a particular carrier.

At block 142, the coarse synchronization correlation result determined from operations at block 140 is tested to determine if it satisfies a threshold criteria Y2. The threshold criteria Y2 is preferably selected to be an intermediate value between the criteria Y1 used at block 86 of FIG. 5 and the criteria Y3 used at block 106 of FIG. 6. If the correlation criteria satisfies the criteria Y2, operations proceed to block 144 and, after correction of the mobile terminal frequency oscillator, fine synchronization operations are executed as described previously with respect to block 108 of FIG. 6 and block 88 of FIG. 5.

The low power S-BCCH signal is then read by the mobile terminal at block 146. Operations at blocks 148 through 156 then proceed in a manner previously described with reference to FIG. 6 for blocks 112–120. If the threshold criteria are not satisfied at block 136, or block 142, or valid data is not found at block 154, operations return to block 132 to determine if any remaining candidate carriers had a previously saved power profile which would satisfy threshold criteria X2.

Figure 8:
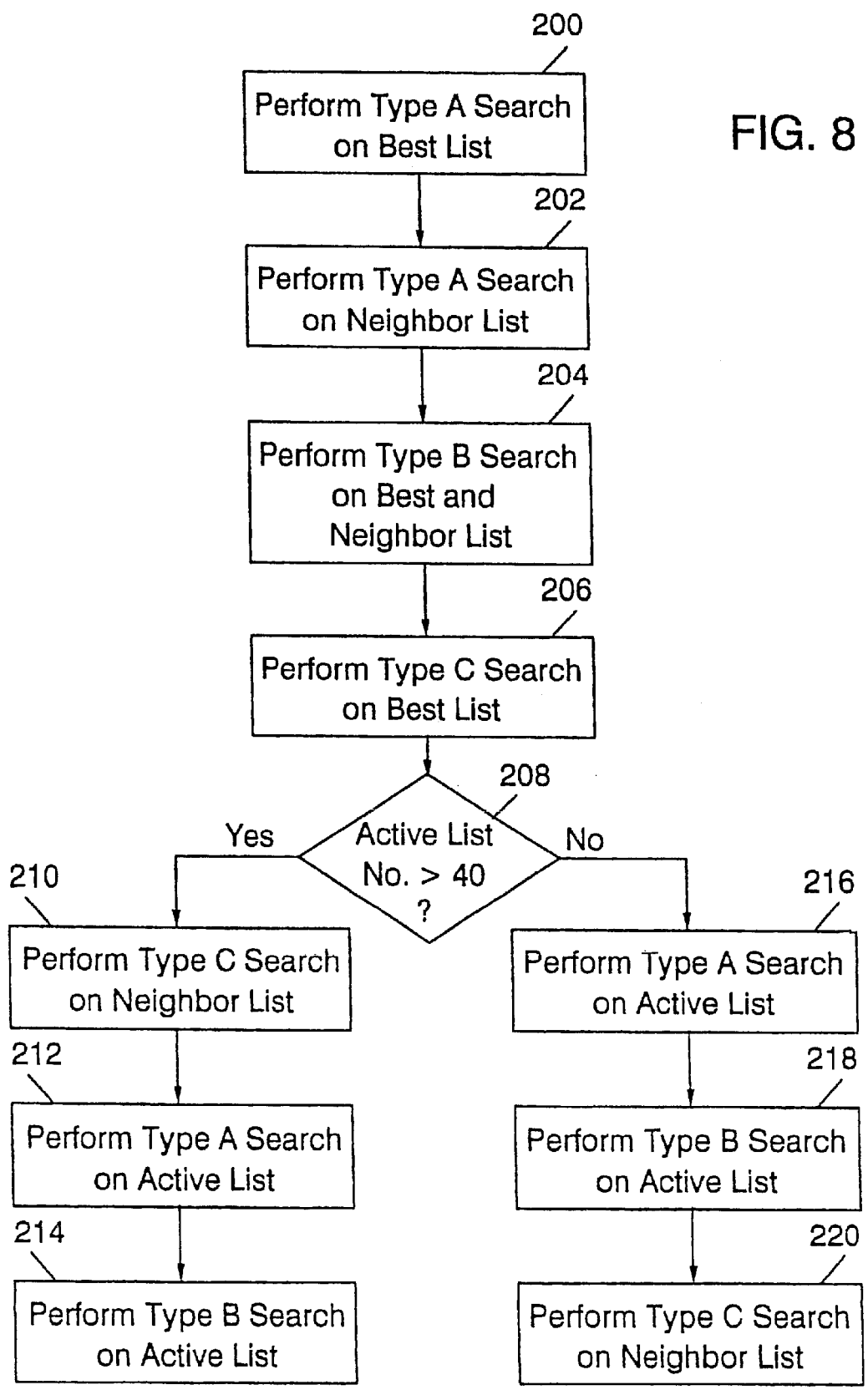
FIG. 8 is a flowchart illustrating operations for searching candidate carriers to establish synchronization according to another aspect of the present invention.

Referring now to FIG. 8, operations will be described for an embodiment of the present invention including both threshold driven and multi-tiered searching according to the teachings of both these aspects of the present invention. Operations for synchronization in the embodiment of FIG. 8 will be described for a mobile terminal including a list of candidate carriers which is broken down into a best list, a neighbor list and an active list as discussed previously. For purposes of this discussion, the best list will be assumed to contain 3 candidate carriers, the neighbor list up to an additional 12 candidate carriers and the active carrier list containing up to 140 carriers (in ACeS). These parameters may be selected in different embodiments and set to different values as they may affect the statistically projected search time involved in the overall synchronization operations as will be discussed subsequently herein.

At block 200 a Type A search is performed for candidate carriers from the best list. At block 202, the Type A search is expanded to test candidate carriers from the neighbor list. At block 204, Type B searches are performed for candidate carriers from the best list and the neighbor list. Preferably, the search order for the candidate carriers tested at block 204 is selected based on the power profile values determined for each carrier previously at blocks 200 and 202. At block 206, the carriers from the best list are searched using a Type C search. It is to be understood that, as described previously with reference to FIGS. 5–7, search operations may be terminated during operations between block 200 and 206 at any point at which a successful synchronization is achieved thereby rendering further searching unnecessary.

If no carrier is successfully required between blocks 200 and block 206, mobile terminal 60 determines at block 208 whether the active list of carriers exceeds a threshold number of carriers (indicated as 40 in FIG. 8). Note that, for ACeS, the active list could include up to all 140 carriers corresponding to the potential 140 spot beams. However, alternatively, the mobile terminal may be provided to a user configured for a limited geographic region thereby having an active list of a smaller number of candidate carriers.

If the number of active list candidate carriers is less than 40, operations proceed to block 210 where a Type C search is performed on candidate carriers from the neighbor list. At block 212, a Type A search is performed for candidate carriers on the active list. Finally, at block 214, a Type B search is performed on the candidate carriers in the active list.

If the number of candidate carriers on the active list is determined to exceed the threshold value at block 208, operations instead proceed to block 216 and a Type A search is performed on the active list followed by a Type B search on the active list at block 218. Finally a Type C search is performed on the neighbor list at block 220. As with blocks 202–206, if a successful synchronization is accomplished in blocks, 210, 212 and 214 or blocks 216, 218 or 220, operations cease. This different treatment based on total numbers in the active list is intended to further optimize search time. Accordingly, where the number is greater than a threshold (of 40 in the illustrated embodiment), a slower Type C search is attempted on the shorter Neighbor list before attempting a faster Type A search on the significantly longer active list.

Figure 9:
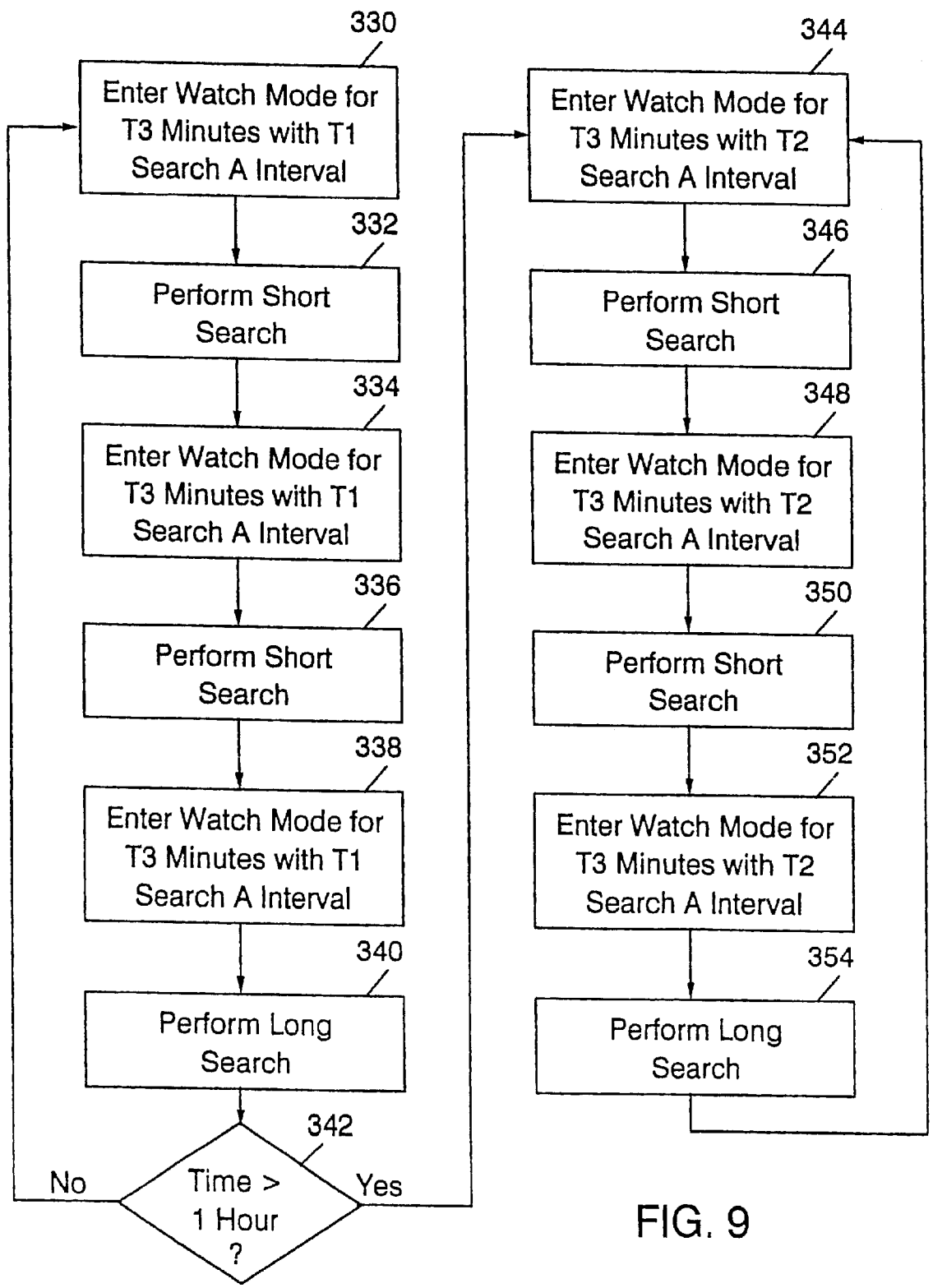
FIG. 9 is a flowchart illustrating continuous search loop operations including a watch mode according to a further aspect of the present invention.

Referring now to FIG. 9, operations for a further aspect of the present invention directed to overcoming the problem of battery power consumption under circumstances where the mobile terminal is at a disadvantaged position and synchronization is not obtained will be described. For purposes of the description of FIG. 9, operations described in FIG. 8 in connection with blocks 200–206 will be referred to as a "short search." A short search is a search which is directed towards situations when the mobile terminal is powering up in the vicinity of the area in which the mobile terminal is normally used. This typically covers an area in the ACeS system of approximately 1,000 km in diameter. Operations from FIG. 8 at blocks 200–220 will be referred to as a "long search." A long search is a more extensive search adding a Type C search on the neighbor list as well as Type A and Type B searches on to the full list of active candidate carriers.

Once a long search has been completed, the mobile terminal has conducted searches of all potential carriers. Accordingly, it is desirable, according to the present invention, to stop processing of continuous searches due to the associated high battery power consumption of such searches. Therefore, as will be described herein with respect to the embodiment of FIG. 9, the mobile terminal will enter a mode in which it initiates searches on a periodic basis.

Preferably, the periodic frequency of search initiation is also determined by the required or desired standby battery life. Essentially, it is to be understood that the battery life is traded off against the speed with which a valid carrier is located once one becomes available, for example, by the user of the mobile terminal moving to a non-blocked condition.

An illustrative embodiment of the "watch mode" operations for a mobile terminal which has failed to acquire synchronization after a long search is shown in FIG. 9. At block 330, the mobile terminal enters watch mode for a determined period of time indicated as T3 minutes. During the T3 minute watch mode at block 330, a Type A search is performed on the best list every predetermined (T1) seconds. The mobile terminal otherwise sleeps when possible depending upon other unrelated operations required of the mobile terminal.

After the T3 minute period of block 330 has been completed, mobile terminal 60 performs a short search (as described with reference to FIG. 8) at block 332 and then returns to watch mode at block 334 for an additional period of time (T3 minutes in the illustrated embodiment). Operations during watch mode at block 334 are as described with reference to block 330. After the watch mode period is passed at block 334, a short search is executed at block 336 and then watch mode is entered again at block 338 for an additional period of time. Finally, at block 340, after 3 consecutive watch mode periods, a long search is conducted.

For the illustrated embodiment of FIG. 9, the watch mode itself varies after a selected period of time. Accordingly, at block 342, the mobile terminal determines whether it has been attempting to acquire synchronization for a period of time greater than a threshold value (indicated as one hour in the illustrated embodiment). If not, operations from block 330–340 are repeated.

If, however, the mobile terminal has been unsuccessfully trying to synchronize for a period greater than one hour, operations move to block 344 and the mobile terminal again enters a watch mode for a selected period of time indicated as T3 minutes. Operations at block 344–354 continue similarly to those previously described for blocks 330–340 except that the interval between short searches on the best list is T2 rather than T1 seconds. T2 seconds is selected to be a longer period of time. It is intended that having a watch mode which reduces search frequency after a predetermined period of time allows increased flexibility in trading off battery power consumption rate and acquisition time of a signal once the mobile terminal is moved to a not disadvantaged position. It is to be understood by those of ordinary skill in the art that additional tiers of variation in search frequency at other break point periods of time may also be incorporated according to the teachings of the present invention. Similarly, it is to be understood that more or less variations on types of searches may also be incorporated in keeping with the teachings of the present invention. It is also to be understood that the benefits of the present invention may be provided in a simplified manner simply by incorporating search operations according to any of FIGS. 5–7 which provide improved performance based on the novel use of thresholds during synchronization search operations. Finally, it is to be understood that the power profile may be generated by a variety of known signal strength characterization techniques and is not limited to those disclosed herein.

Preferably, mobile terminal search operations according to the present invention further provide for an opportunity for the user of the mobile terminal to interfere and force specific types of searches. This may be provided based upon a menu interface of user interface 70. The user may be provided an express right to select carriers to be searched and types of searches to be attempted. Furthermore, the mobile terminal search operations may respond to any user interaction with user interface 70, such as through the mobile terminal keyboard, based on the assumption that, if a user starts entering digits on a keyboard, there is a likelihood the user will soon initiate a phone call. Accordingly, a keyboard entry timer may be provided and a Type A search may be initiated on the best list candidate carriers responsive to a user striking a key on the keyboard of mobile terminal 60. If another key press is detected before the keyboard entry timer expires, the mobile terminal 60 may be configured not to initiate another responsive Type A search. Any key press initiated after expiration of the keyboard entry timer will, in contrast, be utilized to re-initiate a search. If the mobile terminal is interrupted from another type of search, as described herein by the pressed key, it will restart the interrupted search upon completion of the keyboard triggered search (assuming the keyboard triggered search was also unsuccessful).

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for initial synchronization of a mobile terminal with a communication system, the mobile terminal having a list of candidate carriers for the communication system, the method comprising the steps of:

selecting a first carrier from the list of candidate carriers, wherein the mobile terminal is not synchronized to the communication system;

generating a power profile of the first carrier before attempting to synchronize to the first carrier;

comparing the power profile of the first carrier to a first threshold criteria; and then synchronizing to the first carrier if the power profile of the first carrier satisfies the first threshold criteria.

2. A method according to claim 1 further comprising the steps of:

selecting a second carrier from the list of candidate carriers if the power profile of the first carrier does not satisfy the first threshold criteria;

generating a power profile of the second carrier before attempting to synchronize to the second carrier;

comparing the power profile of the second carrier to a second threshold criteria; and then synchronizing to the second carrier if the power profile of the second carrier satisfies the second threshold criteria.

3. A method according to claim 2 wherein the second threshold criteria is more lenient than the first threshold criteria.

4. A method according to claim 1 wherein the synchronizing step includes the steps of:

coarse synchronizing to the first carrier; and then fine synchronizing to the first carrier.

5. A method according to claim 4 wherein the synchronizing step includes the steps of:

reading data from the first carrier;

determining if the data is valid; and then repeating the selecting, generating, comparing and synchronizing steps if the data is not valid.

6. The method of claim 1 wherein the list of candidate carriers for the communication system comprises a list of candidate control channels for the communication system.

7. A synchronization system for initial synchronization with a communication system of a mobile terminal having a list of candidate carriers for the communication system, the synchronization system comprising:

means for selecting a first carrier from the list of candidate carriers, wherein the mobile terminal is not synchronized to the communication system;

means for generating a power profile of the first carrier before attempting to synchronize to the first carrier;

means for comparing the power profile of the first carrier to a first threshold criteria; and means for synchronizing to the first carrier if the power profile of the first carrier satisfies the first threshold criteria.

8. The system of claim 7 wherein the list of candidate carriers for the communication system comprises a list of candidate control channels for the communication system.

9. A synchronization system for initial synchronization with a communication system of a mobile terminal having a list of candidate carriers for the communication system, the synchronization system comprising:

a transceiver configured to receive a selected carrier; and a processor that selects a first carrier from the list of candidate carriers to be received by the transceiver, wherein the mobile terminal is not synchronized to the communication system, generates a power profile of the first carrier before attempting to synchronize to the first carrier, compares the power profile of the first carrier to a first threshold criteria, and synchronizes to the first carrier if the power profile of the first carrier satisfies the first threshold criteria.

10. The system of claim 9 wherein the list of candidate carriers for the communication system comprises a list of candidate control channels for the communication system.

* * * * *